(12) United States Patent
Hong et al.

(10) Patent No.: US 11,387,499 B2
(45) Date of Patent: Jul. 12, 2022

(54) METHOD FOR REGENERATING CELL

(71) Applicant: LG CHEM, LTD., Seoul (KR)

(72) Inventors: Chul Gi Hong, Daejeon (KR); Jae Hyun Lee, Daejeon (KR); Dong Kyu Kim, Daejeon (KR); Dae Soo Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 135 days.

(21) Appl. No.: 16/341,627

(22) PCT Filed: Jul. 10, 2018

(86) PCT No.: PCT/KR2018/007826
§ 371 (c)(1),
(2) Date: Apr. 12, 2019

(87) PCT Pub. No.: WO2019/022409
PCT Pub. Date: Jan. 31, 2019

(65) Prior Publication Data
US 2021/0313628 A1 Oct. 7, 2021

(30) Foreign Application Priority Data

Jul. 27, 2017 (KR) .................. 10-2017-0095184

(51) Int. Cl.
*H01M 10/42* (2006.01)
*H01M 10/0525* (2010.01)
(Continued)

(52) U.S. Cl.
CPC ... *H01M 10/4242* (2013.01); *H01M 10/0525* (2013.01); *H01M 10/44* (2013.01); *H01M 10/523* (2013.01)

(58) Field of Classification Search
None
See application file for complete search history.

(56) References Cited

U.S. PATENT DOCUMENTS

| 4,748,093 A | * | 5/1988 | Turner | H01M 4/62 |
| | | | | 429/81 |
| 6,465,121 B1 | * | 10/2002 | Dawson | H01M 50/70 |
| | | | | 429/51 |

(Continued)

FOREIGN PATENT DOCUMENTS

| CN | 1547283 A | 11/2004 |
| CN | 101030663 A | 9/2007 |

(Continued)

OTHER PUBLICATIONS

KR1020090030152 English translation (Year: 2009).*

(Continued)

*Primary Examiner* — Lucas J. O'Donnell
(74) *Attorney, Agent, or Firm* — Birch, Stewart, Kolasch & Birch, LLP (57) ABSTRACT

A method for regenerating a cell having an electrode assembly, in which electrodes and a separator are alternately combined with each other, an electrolyte, and a battery case accommodating the electrode assembly and the electrolyte according to the present invention includes performing a negative pressure processing process in which a negative pressure is applied to the cell to allow a gas disposed between the electrodes to move outside the electrode assembly and performing an ultrasonic wave processing process in which the cell is stimulated by ultrasonic waves to allow the electrolyte disposed outside the electrode assembly to move between the electrodes.

18 Claims, 11 Drawing Sheets

(51) Int. Cl.
*H01M 10/44* (2006.01)
*H01M 10/52* (2006.01)

(56) References Cited

U.S. PATENT DOCUMENTS

| | | | |
|---|---|---|---|
| 9,214,696 B2* | 12/2015 | Min | .................... H01M 10/052 |
| 2011/0300437 A1 | 12/2011 | Yi | |
| 2013/0076363 A1 | 3/2013 | Takahashi et al. | |
| 2013/0244095 A1* | 9/2013 | Min | .................... H01M 50/103 |
| | | | 429/185 |
| 2017/0040651 A1 | 2/2017 | Okayama et al. | |
| 2017/0271694 A1 | 9/2017 | Jeong et al. | |

FOREIGN PATENT DOCUMENTS

| | | | |
|---|---|---|---|
| CN | 102270757 A | | 12/2011 |
| CN | 12340034 A | | 2/2012 |
| CN | 102983378 A | | 3/2013 |
| CN | 105576314 A | | 5/2016 |
| JP | 2002-190329 A | | 7/2002 |
| JP | 5341823 B2 | | 11/2013 |
| JP | 2017-11978 A | | 1/2017 |
| JP | 2017-73337 A | | 4/2017 |
| KR | 20090030152 A | * | 3/2009 |
| KR | 10-2010-0130685 A | | 12/2010 |
| KR | 10-2011-0132856 A | | 12/2011 |
| KR | 10-2014-0015647 A | | 2/2014 |
| KR | 2014057696 A | * | 5/2014 |
| KR | 10-1535051 B1 | | 7/2015 |
| KR | 10-2016-0074430 A | | 6/2016 |
| KR | 10-1663026 B1 | | 10/2016 |
| KR | 10-2017-0016795 A | | 2/2017 |
| KR | 10-1753807 B1 | | 7/2017 |
| WO | WO 2017/034052 A1 | | 3/2017 |

OTHER PUBLICATIONS

KR-2014057696-A English translation thereof (2014) (Year: 2014).*
Extended European Search Report for European Application No. 18839184.1, dated Dec. 12, 2019.
International Search Report (PCT/ISA/210) issued in PCT/KR2018/007826, dated Oct. 26, 2018.

* cited by examiner

METHOD FOR REGENERATING CELL

CROSS-REFERENCE TO RELATED APPLICATION

The present application claims the benefit of the priority of Korean Patent Application No. 10-2017-0095184, filed on Jul. 27, 2017, which is hereby incorporated by reference in its entirety.

TECHNICAL FIELD

The present disclosure relates to a method for regenerating a cell.

BACKGROUND ART

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Secondary batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

As the existing secondary battery is repeatedly used, the capacity retention of the battery is reduced and degraded. Here, an electrolyte disposed between the electrodes is gasified and reduced, and thus, lithium ions disposed between the electrodes are reduced to reduce capacity retention rate of the battery.

At present, methods for regenerating and reusing the degraded batteries are being studied.

DISCLOSURE OF THE INVENTION

Technical Problem

One aspect of the present invention is to provide a method for regenerating a cell without breaking and damaging the cell.

Technical Solution

A method for regenerating a cell having an electrode assembly, in which electrodes and a separator are alternately combined with each other, an electrolyte, and a battery case accommodating the electrode assembly and the electrolyte according to an embodiment of the present invention may include performing a negative pressure processing process in which a negative pressure is applied to the cell to allow a gas disposed between the electrodes to move outside the electrode assembly and performing an ultrasonic wave processing process in which the cell is stimulated by ultrasonic waves to allow the electrolyte disposed outside the electrode assembly to move between the electrodes.

Advantageous Effects

According to the present invention, the degraded cell may be overcharged to reduce the concentration of the electrolyte adjacent to the electrode of which the lithium ions are reduced so that the electrolyte disposed outside the electrode assembly moves to the inside of the electrode assembly by the osmotic pressure. Thus, the lithium ions contained in the moving electrolyte may be supplied to the electrode to increase in cell capacity, and also, the degraded cell may be regenerated without breaking and damaging the cell.

Also, according to the present invention, the negative pressure may be applied to the cell to allow the gas disposed between the electrodes to move outside of the electrode assembly, and the cell may be stimulated by the ultrasonic waves to allow the electrolyte disposed outside the electrode assembly to effectively move between the electrodes, thereby remarkably increasing in cell capacity.

Furthermore, according to the present invention, after the overcharging process or the ultrasonic wave processing process, the positive pressure and the negative pressure may be repeatedly applied to the cell to allow the electrolyte to more effectively move between the electrodes.

MODE FOR CARRYING OUT THE INVENTION

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 1:
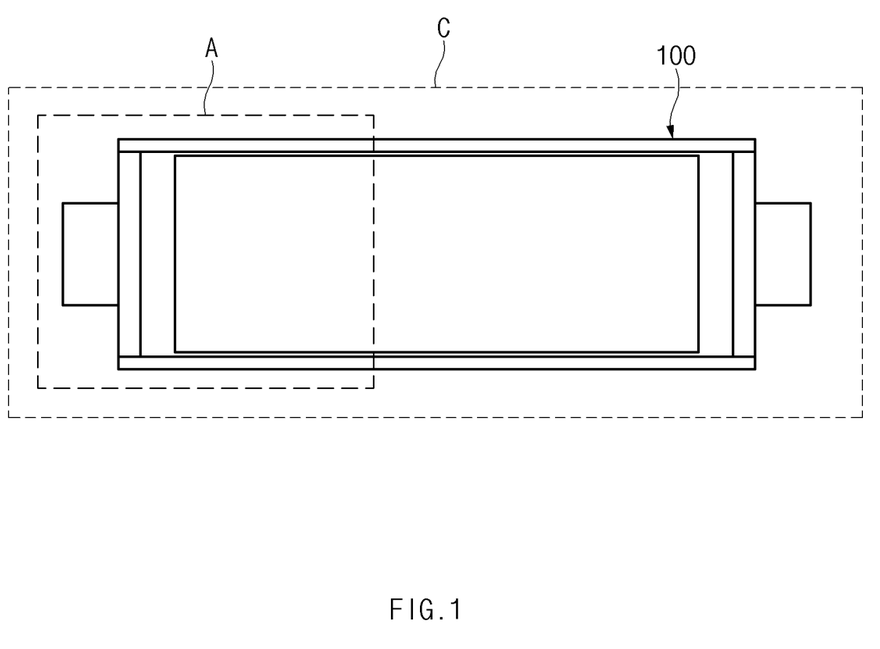
FIG. 1 is a view of a lithium secondary battery applied to a method for regenerating a cell according to an embodiment of the present invention.
Figure 2:
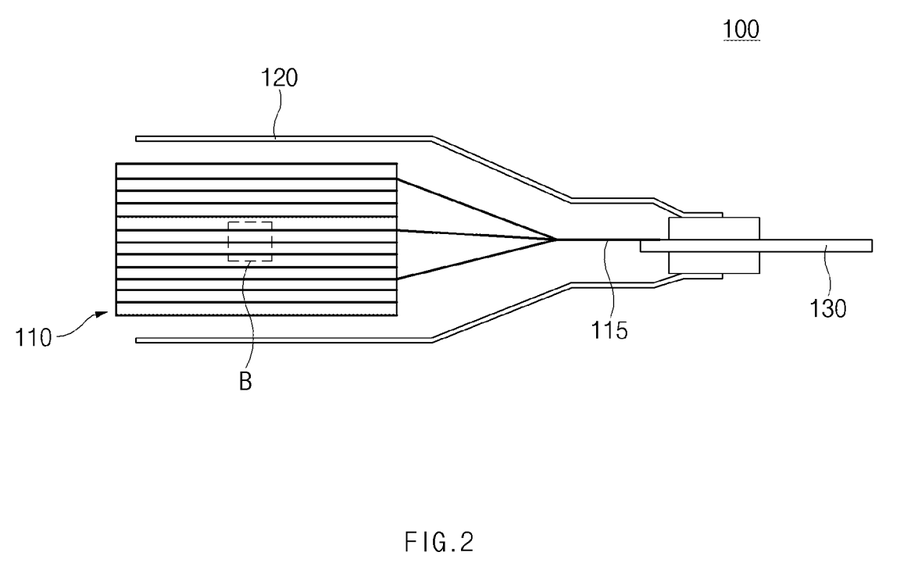
FIG. 2 is a cross-sectional view of a region A of FIG. 1.
Figure 3:
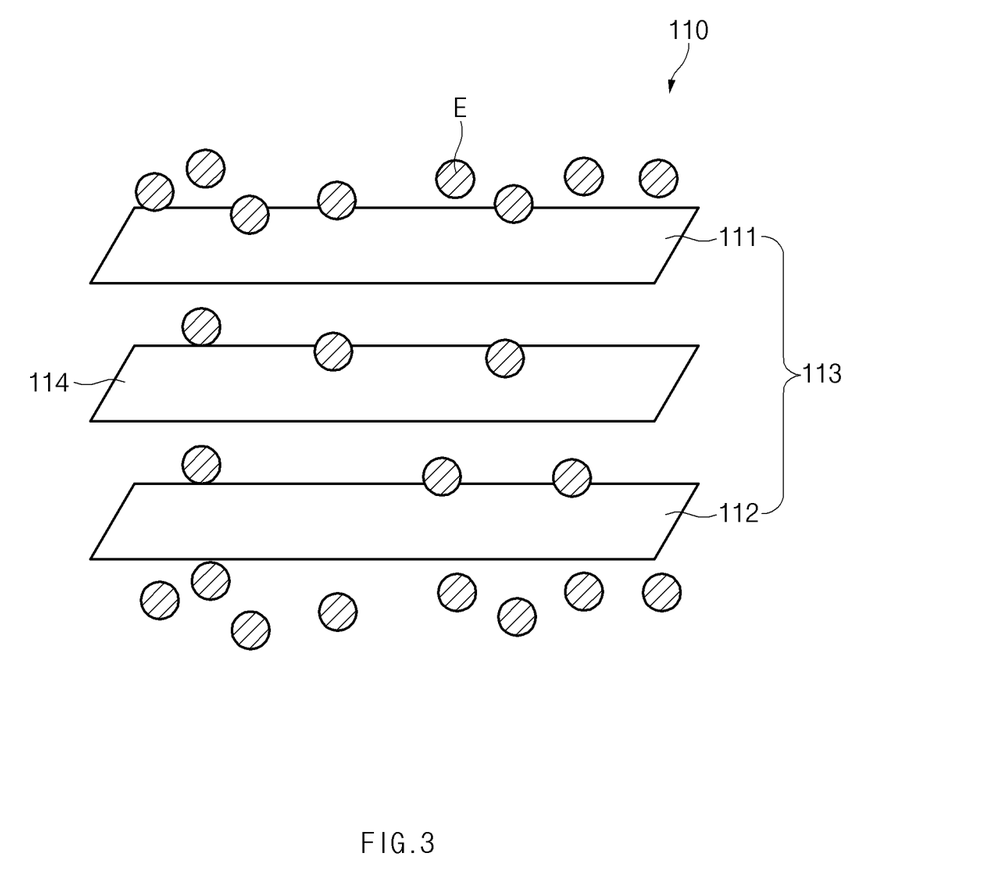
FIG. 3 is a conceptual perspective view of a region B of FIG. 2.

FIG. 1 is a view of a lithium secondary battery applied to a method for regenerating a cell according to an embodiment of the present invention, FIG. 2 is a cross-sectional view of a region A of FIG. 1, and FIG. 3 is a conceptual perspective view of a region B of FIG. 2. Here, FIG. 2 is a conceptual view illustrating a cell by taking the region A of FIG. 1 along a longitudinal direction of the cell.

Referring to FIGS. 1 to 3, a method for regenerating a cell according to an embodiment of the present invention comprises performing a negative pressure processing process of applying a negative pressure N to a cell 100 to allow a gas G disposed between electrodes 113 to move outside of an electrode assembly 110 and performing an ultrasonic wave processing process of stimulating the cell 100 by using ultrasonic waves to allow an electrolyte E disposed outside the electrode assembly 110 to move between the electrodes 113.

Also, the method for regenerating the cell according to an embodiment of the present invention may further comprise performing an overcharging process of overcharging the cell 100 before performing the negative pressure processing process and performing a positive and negative pressure processing process of repeatedly applying a positive pressure and a negative pressure after performing the ultrasonic wave processing process.

Hereinafter, the method for regenerating the cell according to an embodiment of the present invention will be described in more detail with reference to FIGS. 1 to 10.

Referring to FIGS. 1 to 3, the cell 100 applied to the method for regenerating the cell according to an embodiment of the present invention comprises the electrode assembly 110, the electrolyte E, and a battery case 120 accommodating the electrode assembly 110 and the electrolyte E. Here, the cell 100 applied to the method for regenerating the cell according to an embodiment of the present invention may further comprise an electrode lead 130 electrically connected to the electrode assembly 110.

The electrode assembly 110 may be a chargeable and dischargeable power generation element and have a structure in which an electrode 113 and a separator 114 are combined and alternately stacked. Also, the electrode assembly 110 may further comprise an electrode tab 115 electrically connected to the electrode 113 to protrude to the outside of the electrode assembly 110.

The electrode 113 may comprise a positive electrode 111 and a negative electrode 112. Here, the electrode assembly 110 may have a structure in which the positive electrode 111/the separator 114/the negative electrode 112 are alternately stacked.

The positive electrode 111 may comprise a positive electrode collector (not shown) and a positive electrode active material (not shown) applied to the positive electrode collector, and the negative electrode 112 may comprise a negative electrode collector (not shown) and a negative electrode active material (not shown) applied to the negative electrode collector.

For example, the positive electrode collector may be provided as foil made of an aluminum (Al) material.

The positive electrode active material may comprise lithium manganese oxide, lithium cobalt oxide, lithium nickel oxide, lithium iron phosphate, or a compound containing at least one of these and mixtures thereof.

For another example, the positive electrode active material may comprise a High Ni-based positive electrode material. Here, the High Ni-based positive electrode material may comprise one or more of a LiNiMnCoO-based material, a LiNiCoAl-based material, and a LiNiMnCoAl-based material.

For example, the negative electrode collector may be provided as foil made of a copper (Cu) or nickel (Ni) material.

For example, the negative electrode active material may be made of a material comprising synthetic graphite.

For another example, the negative electrode active material may comprise a lithium metal, a lithium alloy, carbon, petroleum coke, activated carbon, graphite, a silicon compound, a tin compound, a titanium compound, or an alloy thereof.

The separator 114 is made of an insulation material to electrically insulate the positive electrode 111 from the negative electrode 112. Here, the separator 114 may be made of, for example, a polyolefin-based resin film such as polyethylene or polypropylene having micropores.

For example, the electrolyte may comprise a non-aqueous electrolyte and a lithium salt as a non-aqueous electrolyte containing lithium.

For example, the non-aqueous electrolyte may comprise an aprotic organic solvent such as N-methyl-2-pyrrolidone, propylene carbonate, ethylene carbonate, butylene carbonate, dimethyl carbonate, diethyle carbonate, gamma-butyrolacton, 1,2-dimethoxy ethane, tetrahydroxy franc, 2-methyl tetrahydrofuran, dimethyl sulfoxide, 1,3-dioxolane, formamide, dimethyl formamide, dioxolane, acetonitrile, nitromethane, methyl formate, methyl acetate, phosphoric acid tri-ester, trimethoxy methane, dioxolane derivatives, sulfolan, methyl sulfolan, 1,3-dimethyl-2-imidazolidinone, a propylene carbonate derivative, a tetrahydrofuran derivative, ether, methyl propionate, and ethyl propionate.

Here, the lithium salt is easily dissolved in the non-aqueous electrolyte. For example, the lithium salt may comprise LiCl, LiBr, LiI, LiClO$_4$, LiBF$_4$, LiB10Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, chloroborane lithium, lower aliphatic carboxylic acid lithium, 4phenyl lithium borate, or an imide.

In some cases, the lithium salt may comprise an organic solid electrolyte or an inorganic solid electrolyte.

For example, the organic solid electrolyte may comprise a copolymer comprising a polyethylene derivative, a polyethylene oxide derivative, a polypropylene oxide derivative, a phosphoric acid ester polymer, poly agitation lysine, polyester sulfide, polyvinyl alcohol, poly vinylidene fluoride, or an ionic disintegrator.

For example, the inorganic solid electrolyte may comprise a Li-based nitride such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$, a halide, or a sulfate.

Further, the following compounds may be added to the non-aqueous electrolyte in order to improve discharge and charge characteristics and flame retardancy. For example, the non-aqueous electrolyte may comprise pyridine, triethyl phosphite, triethanolamine, cyclic ether, ethylenediamine, n-glyme, hexaphosphoric triamide, a nitrobenzene derivative, sulfur, a quinone-imine dye, N-substituted oxazolidinone, N,N-substituted imidazolidine, ethylene glycol dialkyl ether, an ammonium salt, pyrrole, 2-methoxyethanol, and aluminum trichloride. In some cases, in order to give incombustibility to the electrolyte, the electrolyte may further comprise a halogen-containing solvent such as carbon tetrachloride and ethylene trifluoride. Further, in order to improve high-temperature storage characteristics, the electrolyte may comprise carbon dioxide gas.

Figure 4:
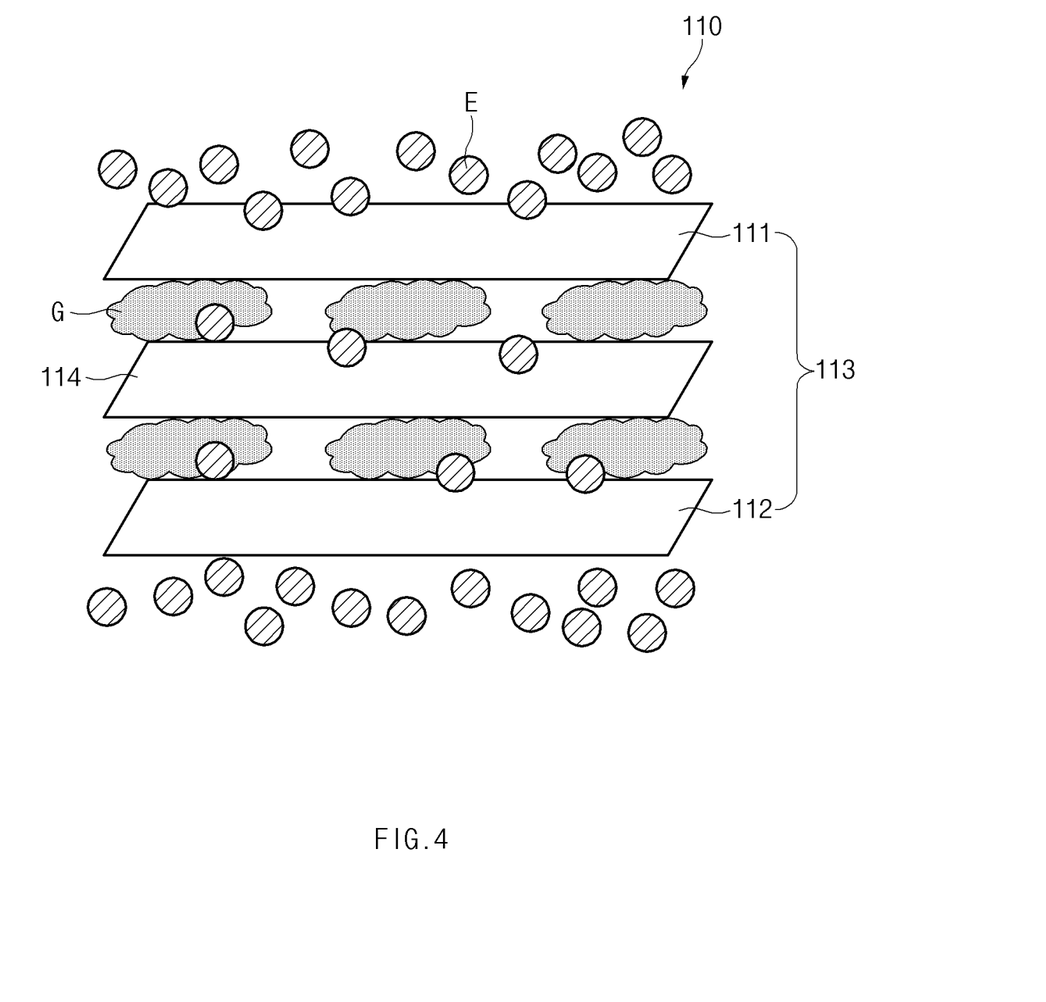
FIG. 4 is a conceptual partial perspective view illustrating an overcharging process in the method for regenerating the cell according to an embodiment of the present invention.

FIG. 4 is a conceptual partial perspective view illustrating an overcharging process in the method for regenerating the cell according to an embodiment of the present invention.

Referring to FIGS. 2 and 4, in an overcharging process, the cell 100 may be overcharged before the negative pressure processing process to reduce a concentration of the electrolyte E disposed inside the electrode assembly 110.

In more detail, in the overcharging process, the cell 100 may be overcharged to allow the electrolyte E adjacent to the electrode 113 to be formed as a gas G through side reaction. Thus, as the concentration of the electrolyte E disposed inside the electrode assembly 110 is reduced, the electrolyte E disposed outside the electrode assembly 110 may move to the inside of the electrode assembly 110 by an osmotic pressure.

Here, in the overcharging process, for example, a voltage of 4.3 V or more may be applied to overcharge the cell 100. In more detail, in the overcharging process, for example, a voltage of 4.3 V to 4.5 V may be applied to overcharge the cell 100. Thus, when an overvoltage exceeding 4.3 V that exceeds a voltage range of 2.2 V to 4.2 V of the general cell 100 is applied, the electrolyte E may be converted into a gas G due to side reaction.

In the overcharging process, for example, the cell 100 may be rapidly overcharged for 0.1 seconds to 1 second. Thus, when the cell 100 is overcharged, the side reaction may occur first in the electrolyte E disposed on a surface of each of the electrodes 113. Thus, only the electrolyte E disposed close to the electrode 113 may be gasified through the rapid overcharging, and the electrolyte E disposed outside the electrode assembly 110 may not be gasified.

Figure 5:
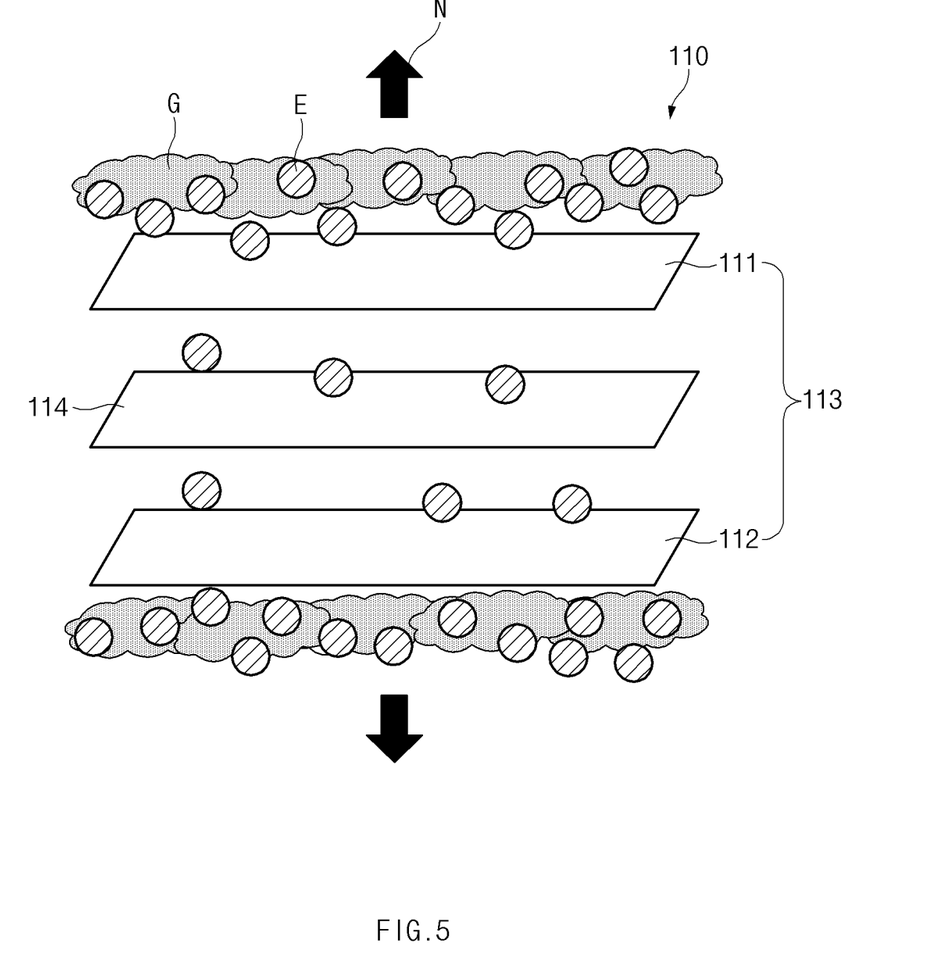
FIG. 5 is a conceptual partial perspective view illustrating a negative pressure processing process in the method for regenerating the cell according to an embodiment of the present invention.

FIG. 5 is a conceptual partial perspective view illustrating the negative pressure processing process in the method for regenerating the cell according to an embodiment of the present invention.

Referring to FIGS. 1, 2, and 5, in the negative pressure processing process, a negative pressure N may be applied to the cell 100 so the gas G disposed between the electrodes 113 may move outside of the electrode assembly 110. Here, in the negative pressure processing process, the gas G disposed inside the electrode assembly 110, which is generated through the overcharging process or generated while the cell 100 is degraded due the continuous charging/discharging thereof, may move outside of the electrode assembly 110. Thus, the gas G disposed inside the electrode assembly 110 may move outside of the electrode assembly 110 so that the electrolyte E disposed outside the electrode assembly 110 easily moves to the inside of the electrode assembly 110. For example, a gas absorbent (not shown) may be provided in the cell 100 to absorb the gas G that moves to the outside of the electrode assembly 110.

Also, in the negative pressure processing process, after the cell 100 is accommodated in a chamber C, the inside of the chamber C may be vacuumized to apply the negative pressure N to the cell 100. Here, for example, a vacuum pump (not shown) may be connected to the chamber C to vacuumize the inside of the chamber C through the vacuum pump.

Furthermore, in the negative pressure processing process, the inside of the chamber C may be vacuumized so that the inside of the chamber C is in a pressure state of −90 Kpa to −100 Kpa.

Figure 6:
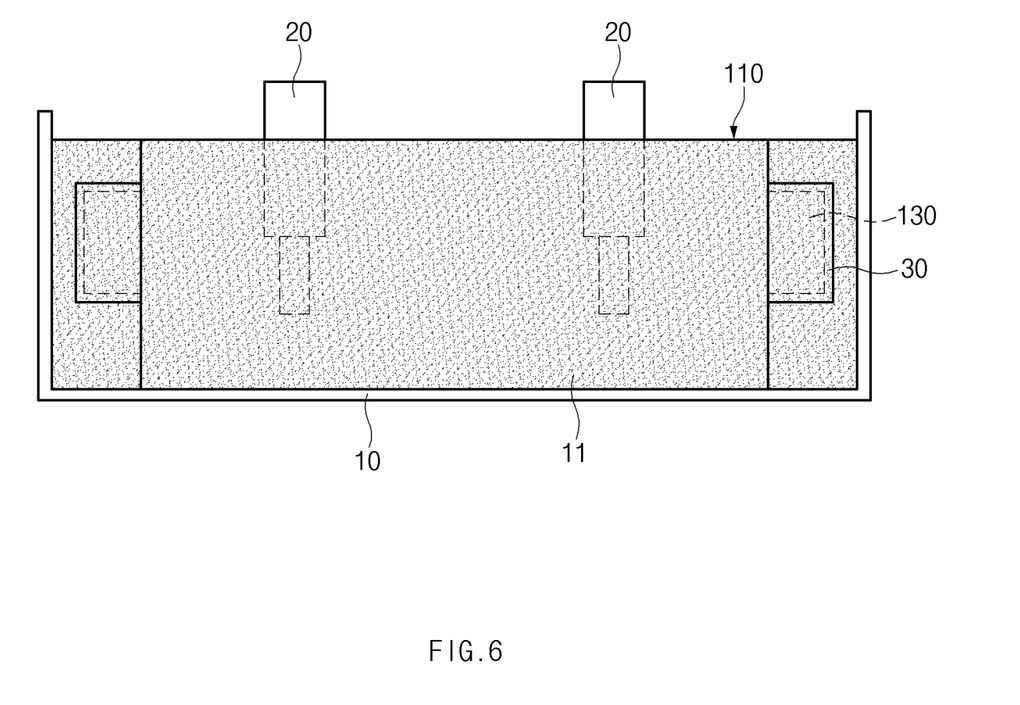
FIG. 6 is an conceptual projective view illustrating an ultrasonic wave processing process in the method for regenerating the cell according to an embodiment of the present invention.
Figure 7:
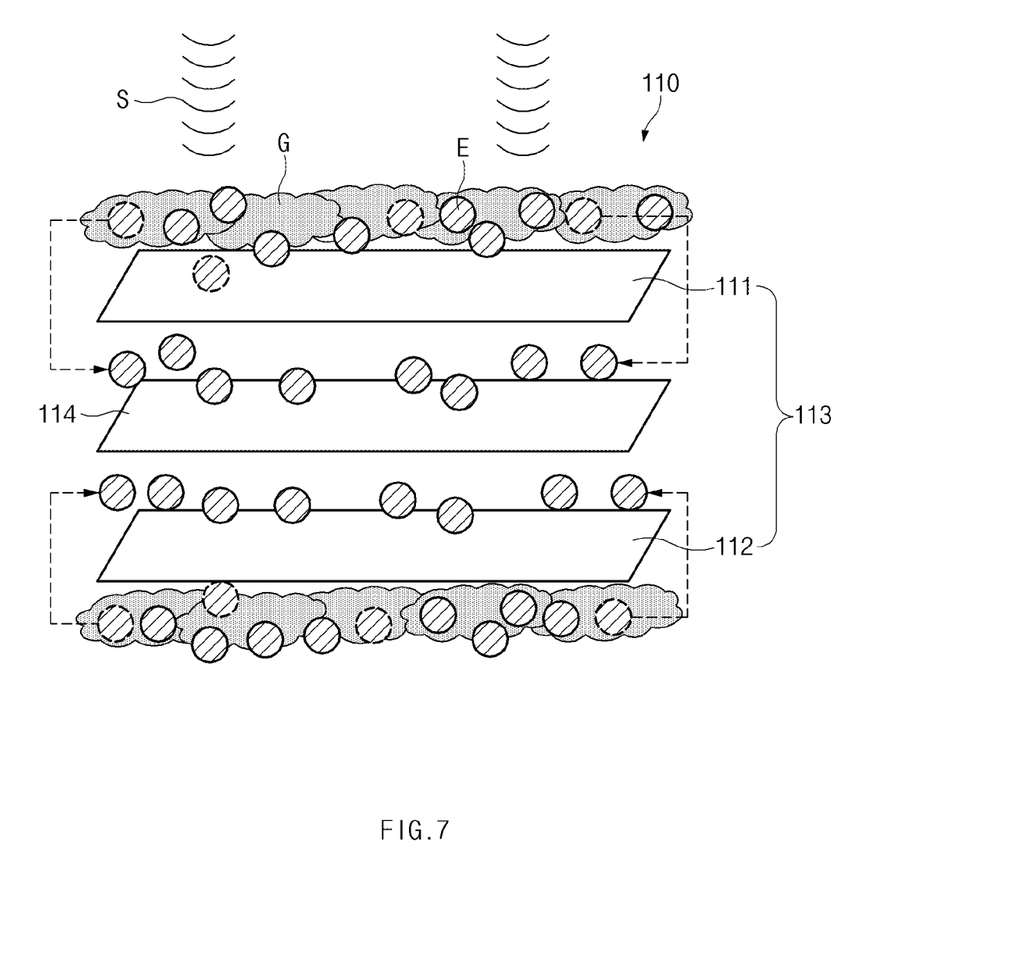
FIG. 7 is a conceptual partial perspective view illustrating the ultrasonic wave processing process in the method for regenerating the cell according to an embodiment of the present invention.

FIG. 6 is an conceptual projective view illustrating an ultrasonic wave processing process in the method for regenerating the cell according to an embodiment of the present invention, and FIG. 7 is a conceptual partial perspective view illustrating the ultrasonic wave processing process in the method for regenerating the cell according to an embodiment of the present invention.

Referring to FIGS. 6 and 7, in the ultrasonic wave processing process, the cell 100 may be stimulated by ultrasonic waves S to allow the electrolyte E disposed outside the electrode assembly 110 to move between the electrode 113. Here, in the ultrasonic wave processing process, ultrasonic waves S having intensities of 40% to 80%, 20 kHz to 30 kHz, and 20 W/cm² may be applied to the cell 100.

Also, in the ultrasonic wave processing process, the cell 100 may be stimulated by the ultrasonic waves S in a state in which the cell 100 is immersed in an insulation liquid 11 made of a material having no electrical conductivity. Here, the insulation liquid 11 may comprise ethanol. Here, the insulation liquid 11 may be made of, for example, an ethanol covalent bonding compound having no ions that are capable of transporting electricity.

Furthermore, in the ultrasonic wave processing process, the electrode lead 130 may be sealed with an insulation tape 30, and the cell 100 may be immersed in a bath 10 in which ethanol is accommodated.

Thus, when the ultrasonic wave processing is performed on the cell 100, an occurrence of short circuit due to a solvent may be prevented.

In the ultrasonic wave processing process, an end of an ultrasonic generator 20 may be immersed in the bath 10 containing ethanol to generate ultrasonic waves S and thereby to stimulate the cell 100.

Also, in the ultrasonic wave processing process, when the cell 100 is stimulated by the ultrasonic waves S, a positive pressure may be applied to the cell 100. Thus, the electrolyte E disposed outside the electrode assembly 110 may more effectively move between the electrodes 113.

Figure 8:
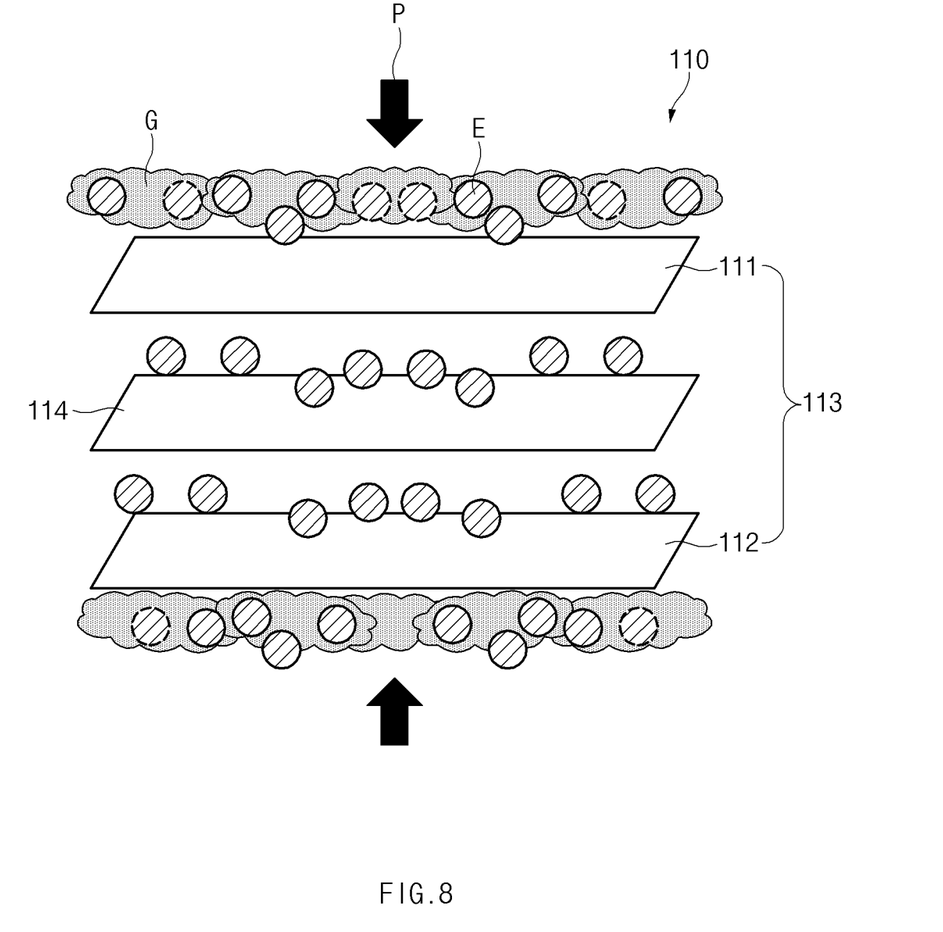
FIG. 8 is a conceptual partial perspective view illustrating a positive pressure processing process in a positive and negative pressure processing process of the method for regenerating the cell according to an embodiment of the present invention.
Figure 9:
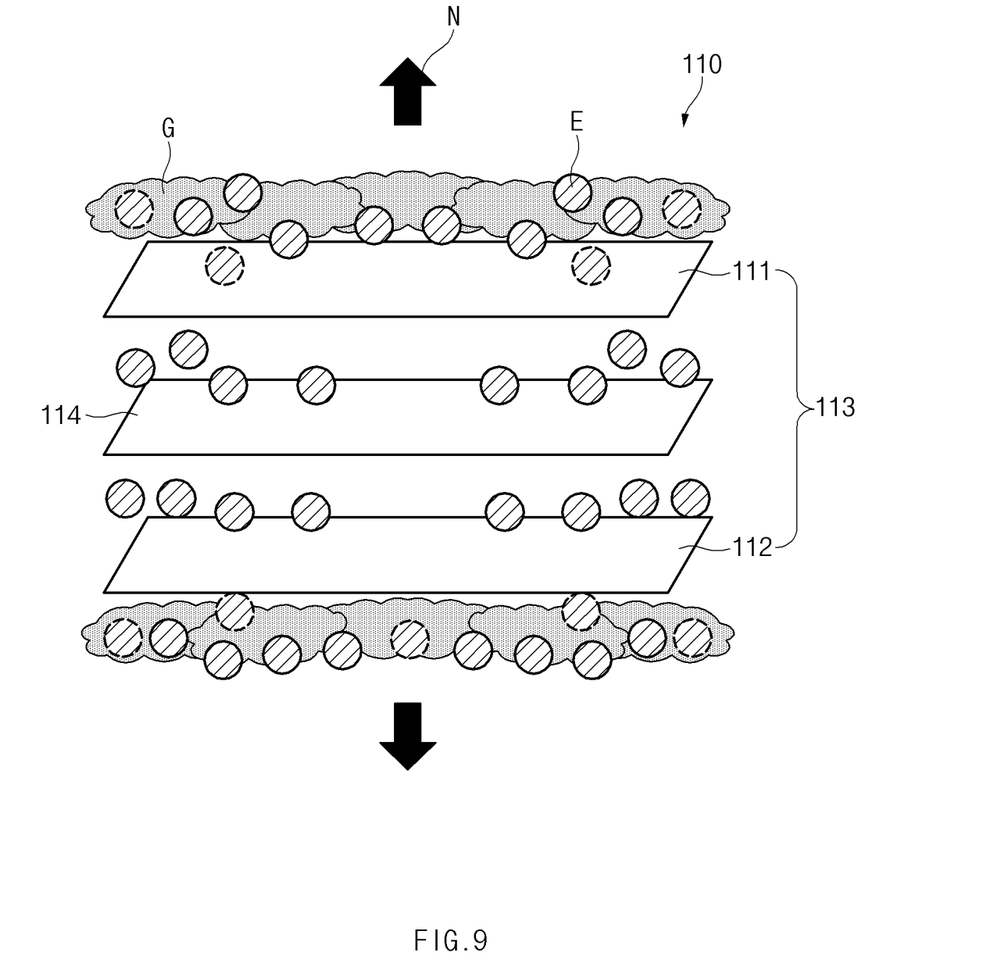
FIG. 9 is a conceptual partial perspective view illustrating a negative pressure processing process in the positive and negative pressure processing process of the method for regenerating the cell according to an embodiment of the present invention.

FIG. 8 is a conceptual partial perspective view illustrating a positive pressure processing process in a positive and negative pressure processing process of the method for regenerating the cell according to an embodiment of the present invention, and FIG. 9 is a conceptual partial perspective view illustrating a negative pressure processing process in the positive and negative pressure processing process of the method for regenerating the cell according to an embodiment of the present invention.

Referring to FIGS. 1, 2, 8, and 9, in the positive and negative pressure processing process, the positive pressure P and the negative pressure N may be repeatedly applied to the cell 100 to allow the electrolyte E disposed outside the electrode assembly 110 to move between the electrodes 113.

Also, in the positive and negative pressure processing process, after the cell 100 is accommodated in the chamber C, the positive pressure P may be applied to the cell 100 by making the inside of the chamber C into a state of the positive pressure P (see FIG. 8), and the negative pressure N may be applied to the cell 100 by making the inside of the chamber C into a state of the negative pressure P (see FIG. 9).

Here, a vacuum pump and a gas pressurizing pump (not shown) may be connected to the chamber C to generate the positive pressure P and the negative pressure N inside the chamber C through the vacuum pump and the gas pressurizing pump.

Here, in the positive and negative pressure processing process, a pressure of 90 kPa to 100 kPa as the positive pressure P may be applied to the cell 100, and a pressure of −90 kPa to −100 kPa as the negative pressure N may be applied to the cell 100.

In the above-described method for regenerating the cell according to an embodiment, the electrolyte E disposed outside the electrode assembly 110 may move to the inside of the electrode assembly 110. Thus, the charging/discharging of the cell 100 may be repeated so that an amount of lithium ions inside the electrode assembly 110, in which the lithium ions are insufficient, increases. That is, the lithium ions contained in the electrolyte E disposed outside the electrode assembly 110 may move to the inside of the electrode assembly 110, and thus, the lithium ions may be supplied to the electrode assembly 110, in which the lithium ions are insufficient, to increase in capacity of the cell 100. Also, the cell 100, which decreases in capacity, may be regenerated without breaking and damaging the cell 100.

Figure 10:
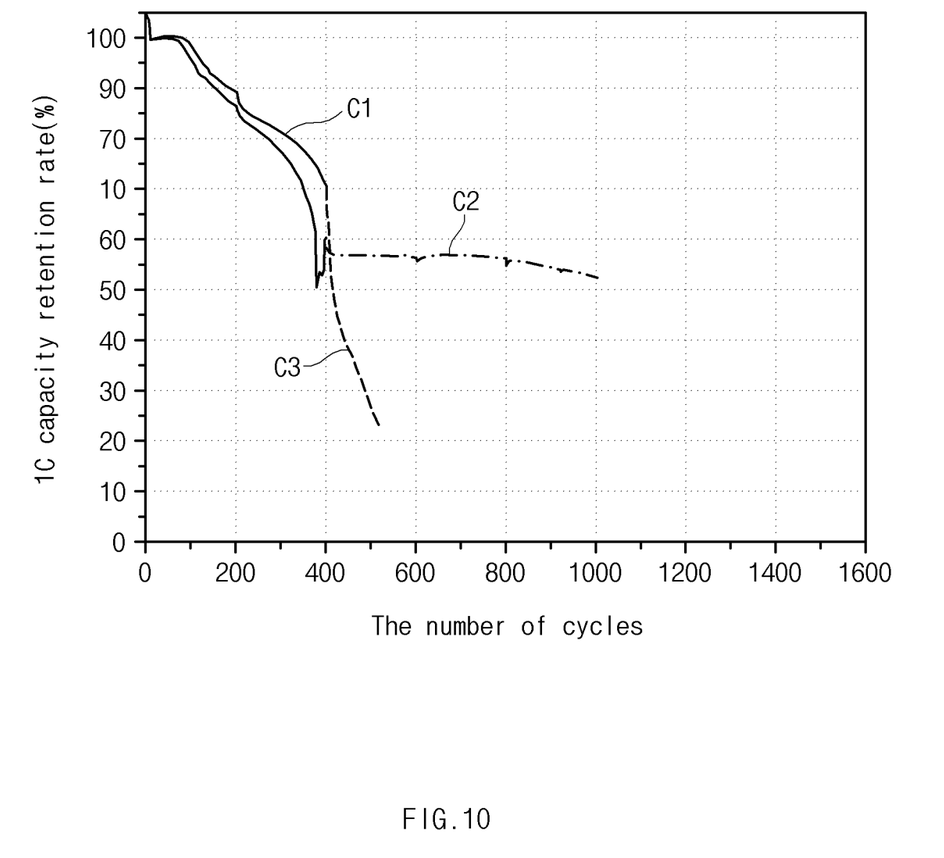
FIG. 10 is a graph illustrating a capacity retention rate of a cell that is revived through the method for regenerating the cell according to an embodiment of the present invention.

FIG. 10 is a graph illustrating a capacity retention rate of the cell that is revived through the method for regenerating the cell according to an embodiment of the present invention.

In the graph shown in FIG. 10, an initial cell C1, a cell C2 that is regenerated through the method for regenerating the cell according to an embodiment of the present invention, and a cell C3 that has not been regenerated are illustrated.

Here, in FIG. 10, a horizontal axis represents the number of cycles, and a vertical axis represents a 1C (coulomb) capacity retention rate of the cell.

Referring to the graph shown in FIG. 10, it is seen that the initial cell C1 decreases in capacity retention rate as the cycle progresses.

Here, it is seen that the initial cell C1 rapidly decreases in capacity retention rate to be degraded after 400 cycles. That is, it is seen that the cell C3, which has not been regenerated, is degraded after 500 cycles because the capacity retention rate remarkably decreases to 25% or less.

However, it is seen that the cell C2, which is regenerated through the method for regenerating the cell according to an embodiment of the present invention, is maintained to a capacity retention rate of 50% or more until reaching 1,000 cycles. That is, it is seen through the graph shown in FIG. 10 that the capacity of the cell C2, which is regenerated through the method for regenerating the cell according to an embodiment of the present invention, is significantly improved.

Figure 11:
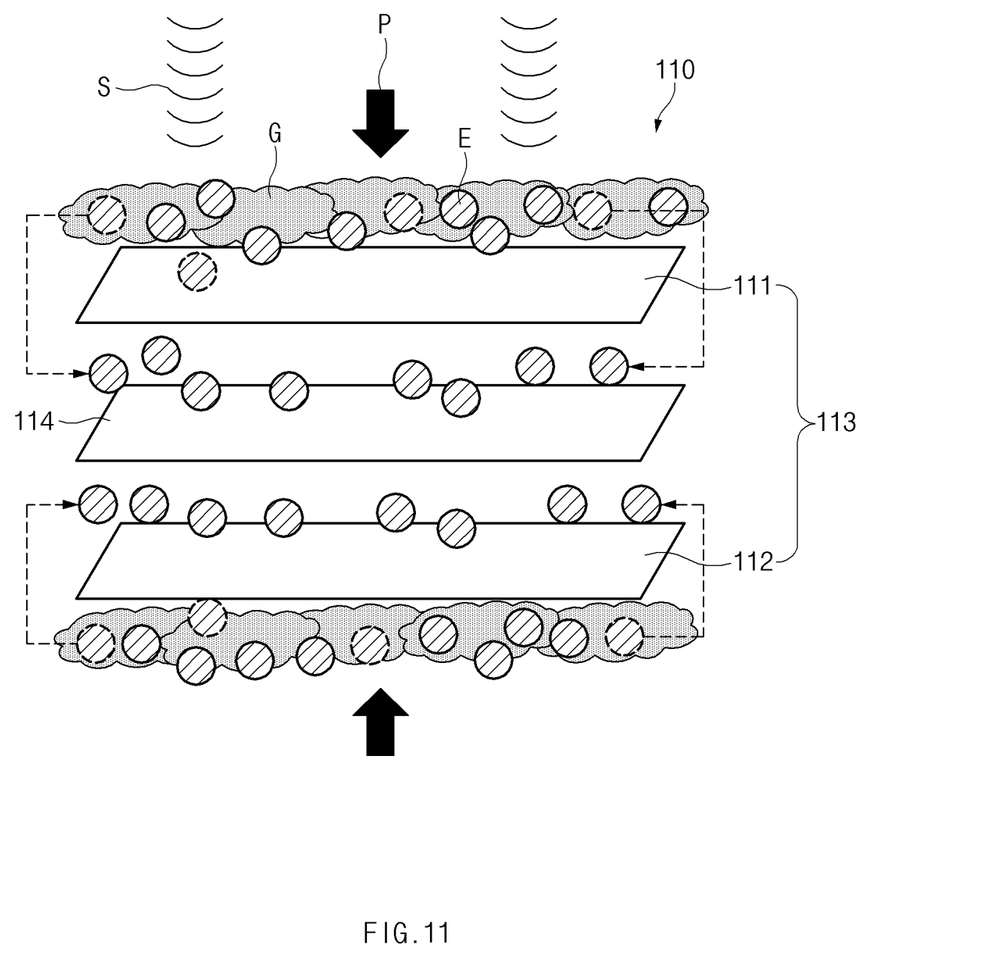
FIG. 11 is a conceptual partial perspective view illustrating a positive pressure processing process in a positive and negative pressure processing process of a method for regenerating a cell according to another embodiment of the present invention.

FIG. 11 is a conceptual partial perspective view illustrating a positive pressure processing process in a positive and negative pressure processing process of a method for regenerating a cell according to another embodiment of the present invention.

Hereinafter, a method for regenerating a cell according to another embodiment of the present invention will be described with reference to FIG. 11.

Referring to FIG. 11, the method for regenerating the cell according to another embodiment of the present invention is different from the method for regenerating the cell according to the foregoing embodiment in a positive pressure processing process of the positive and negative pressure processing process. Thus, contents of this embodiment, which are duplicated with those according to the forgoing embodiment, will be briefly described, and also, differences therebetween will be mainly described.

In the positive and negative pressure processing process of the method for regenerating the cell according to another embodiment of the present invention, a positive pressure P and a negative pressure N may be repeatedly applied to a cell 100 to allow an electrolyte E disposed outside an electrode assembly 110 to move between electrodes 113. Here, when the positive pressure P is applied to the cell 100, the cell 100 may be stimulated by ultrasonic waves S.

Thus, the electrolyte E disposed outside the electrode assembly 110 may more smoothly move to the inside of the electrode assembly 110.

Here, a positive pressure P of 90 kPa to 100 kPa may be applied to the cell 100, and the cell 100 may be stimulated by ultrasonic waves having an intensity of 40% to 80% and a frequency of 20 kHz to 30 kHz and 20 W/cm$^2$.

In the positive and negative pressure processing process, the cell 100 may be accommodated in a chamber C, and then, the positive pressure P may be applied to the cell 100 by making the inside of the chamber C into a state of the positive pressure P (see FIG. 1).

While the present invention has been particularly shown and described with reference to exemplary embodiments thereof, it is to be understood that the scope of the present invention is not limited to the method for regenerating the cell according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A method for regenerating a cell having an electrode assembly, in which electrodes and a separator are alternately combined with each other, an electrolyte, and a battery case accommodating the electrode assembly and the electrolyte, the electrolyte in the battery case includes electrolyte disposed outside the electrode assembly and electrolyte disposed inside the electrode assembly, the method comprising: performing a negative pressure processing process in which a negative pressure is applied externally to the battery case to allow a gas disposed between the electrodes to move outside the electrode assembly; performing an ultrasonic wave processing process in which the cell is stimulated by ultrasonic waves to allow the electrolyte disposed outside the electrode assembly to move between the electrodes; and after performing the ultrasonic wave processing process, performing a positive and negative pressure processing process in which a positive pressure and the negative pressure are repeatedly applied to the cell to allow the electrolyte disposed outside the electrode assembly to move between the electrodes.

2. The method of claim 1, further comprising, before performing the negative pressure processing process, performing an overcharging process in which the cell is overcharged to allow the electrolyte adjacent to the electrodes to generate the gas through side reaction of the electrolyte, and, as a concentration of the electrolyte disposed inside the electrode assembly is reduced, the electrolyte disposed outside the electrode assembly moves to the inside of the electrode assembly by an osmotic pressure.

3. The method of claim 2, wherein, in the overcharging process, a voltage of 4.3 V or more is applied to the cell to overcharge the cell.

4. The method of claim 3, wherein, in the overcharging process, a voltage of 4.3 V to 4.5 V is applied to the cell to overcharge the cell.

5. The method of claim 2, wherein, in the overcharging process, the cell is overcharged for 0.1 seconds to 1 second.

6. A method for regenerating a cell having an electrode assembly, in which electrodes and a separator are alternately combined with each other, an electrolyte, and a battery case accommodating the electrode assembly and the electrolyte, the electrolyte in the battery case includes electrolyte disposed outside the electrode assembly and electrolyte disposed inside the electrode assembly, the method comprising:
  performing a negative pressure processing process in which a negative pressure is applied externally to the battery case to allow a gas disposed between the electrodes to move outside the electrode assembly;
  performing an ultrasonic wave processing process in which the cell is stimulated by ultrasonic waves to allow the electrolyte disposed outside the electrode assembly to move between the electrodes; and
  after performing the ultrasonic wave processing process, performing a positive and negative pressure processing process in which a positive pressure and the negative pressure are repeatedly applied to the cell to allow the electrolyte disposed outside the electrode assembly to move between the electrodes,
  wherein, in the positive and negative pressure processing process, after accommodating the cell in a chamber, the positive pressure is applied to the cell by making an inside of the chamber into a positive pressure state, and the negative pressure is applied to the cell by making the inside of the chamber into a negative pressure state.

7. The method of claim 1, wherein, in the positive and negative pressure processing process, when the positive pressure is applied to the cell, stimulating the cell by the ultrasonic waves.

8. The method of claim 1, wherein, in the negative pressure processing process, after accommodating the cell in a chamber, applying a vacuum to an inside of the chamber to apply the negative pressure to the cell.

9. The method of claim 8, wherein, in the negative pressure processing process, the inside of the chamber becomes a pressure state of −90 kPa to −100 kPa.

10. The method of claim 1, wherein, in the ultrasonic wave processing process, after immersing the cell in an insulation liquid, the cell is stimulated by ultrasonic waves.

11. The method of claim 10, wherein the insulation liquid comprises ethanol.

12. The method of claim 11, wherein the cell comprises an electrode lead electrically connected to the electrode assembly so that a portion of the electrode lead protrudes outside of the battery case, and
  in the ultrasonic wave processing process, sealing the electrode lead with an insulation tape, and immersing the cell in a bath in which ethanol is accommodated.

13. The method of claim 1, wherein, in the ultrasonic wave processing process, ultrasonic waves of 20 kHz to 30 kHz are applied to the cell.

14. The method of claim 1, wherein, in the ultrasonic wave processing process, when the cell is stimulated by the ultrasonic waves, applying a positive pressure to the cell.

15. The method of claim 3, wherein, in the overcharging process, the cell is overcharged for 0.1 seconds to 1 second.

16. The method according to claim 2, wherein the ultrasonic wave processing process is performed by at least one ultrasonic generator disposed outside the battery case.

17. The method according to claim 6, wherein the ultrasonic wave processing process is performed by at least one ultrasonic generator disposed outside the battery case.

18. The method according to claim 6, further comprising, before performing the negative pressure processing process, performing an overcharging process in which the cell is overcharged to allow the electrolyte adjacent to the electrodes to generate the gas through side reaction of the electrolyte, and, as a concentration of the electrolyte disposed inside the electrode assembly is reduced, the electrolyte disposed outside the electrode assembly moves to the inside of the electrode assembly by an osmotic pressure.

* * * * *